US007874488B2

(12) United States Patent
Parkinson

(10) Patent No.: US 7,874,488 B2
(45) Date of Patent: Jan. 25, 2011

(54) ELECTRONIC INK FOR IDENTITY CARD

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 151 days.

(21) Appl. No.: 11/809,234

(22) Filed: May 31, 2007

(65) Prior Publication Data

US 2008/0296367 A1 Dec. 4, 2008

(51) Int. Cl.
*G06K 19/00* (2006.01)
(52) U.S. Cl. ...................................................... 235/487
(58) Field of Classification Search .................. 235/380, 235/486, 487
See application file for complete search history.

(56) References Cited

U.S. PATENT DOCUMENTS

| | | | | |
|---|---|---|---|---|
| 5,734,154 | A * | 3/1998 | Jachimowicz et al. | 235/492 |
| 7,140,550 | B2 * | 11/2006 | Ramachandran | 235/493 |
| 7,172,115 | B2 * | 2/2007 | Lauden | 235/380 |
| 7,748,634 | B1 * | 7/2010 | Zehr et al. | 235/492 |
| 2004/0129787 | A1 * | 7/2004 | Saito et al. | 235/492 |
| 2005/0211784 | A1 * | 9/2005 | Justin | 235/492 |
| 2005/0247777 | A1 * | 11/2005 | Pitroda | 235/380 |
| 2006/0243806 | A1 * | 11/2006 | Goodman et al. | 235/462.13 |
| 2006/0278698 | A1 * | 12/2006 | Lovett | 235/380 |
| 2007/0131759 | A1 * | 6/2007 | Cox et al. | 235/380 |
| 2007/0246529 | A1 * | 10/2007 | Lalo et al. | 235/380 |
| 2008/0164304 | A1 * | 7/2008 | Narasimhan et al. | 235/375 |

FOREIGN PATENT DOCUMENTS

WO WO 2005/109887 A1 * 11/2005

* cited by examiner

*Primary Examiner*—Daniel A Hess
(74) *Attorney, Agent, or Firm*—Blakely, Sokoloff, Taylor & Zafman LLP

(57) ABSTRACT

A method and apparatus for an identity card with improved security features. The identity card can have a programmable display. The display can be used to display sensitive data under defined circumstances. The card may have an interactive interface to receive input from a user. The card may also have a input/output interface to allow the exchange of data from the card to an external device. These elements can be used together to give a holder of a card control over the access to the data in the card and thwart counterfeiting and identity theft.

21 Claims, 4 Drawing Sheets

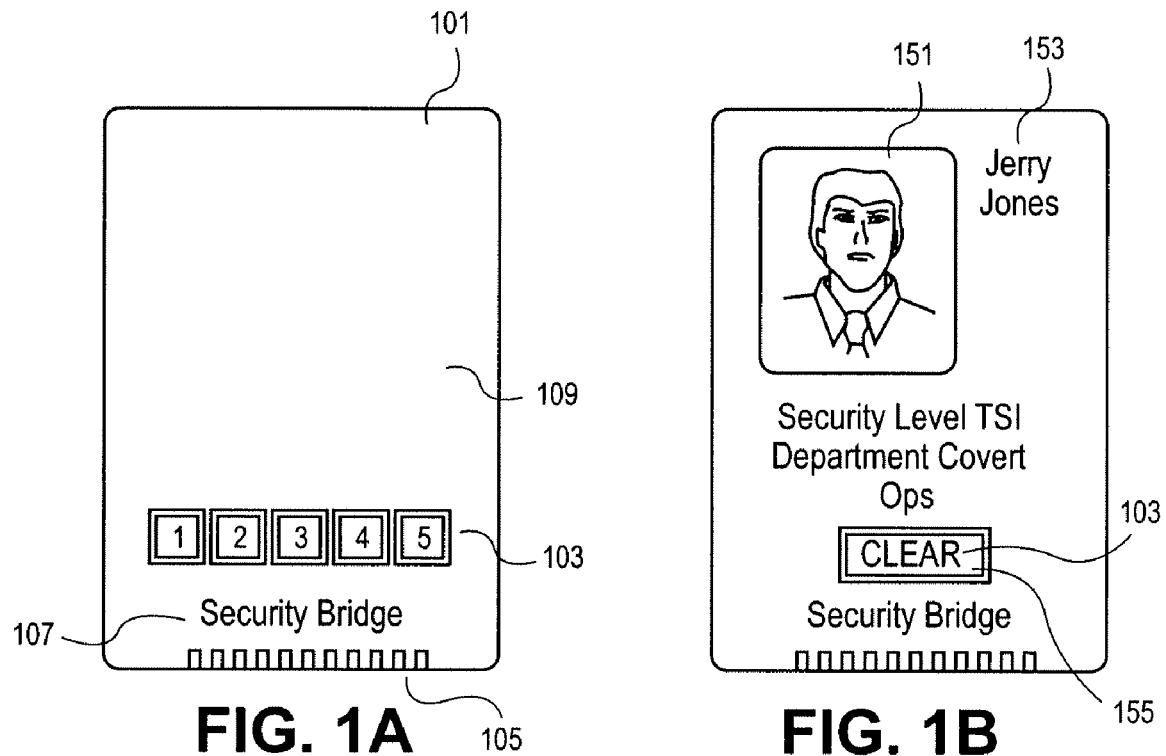
FIG. 1A  FIG. 1B
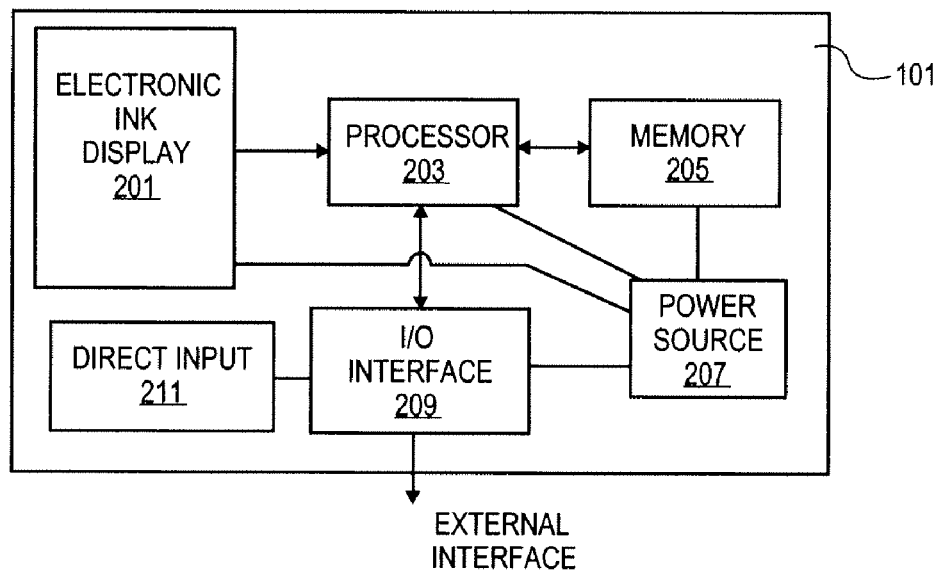
FIG. 2

US 7,874,488 B2

ELECTRONIC INK FOR IDENTITY CARD

TECHNICAL FIELD

Embodiments of the invention related to the use of a identify card for managing security. Specifically, embodiments of the invention relate to the use of an identity card with an electronic ink display.

BACKGROUND

Identity cards are commonly used to control access to computers, locations, privileges and similar resources. The identity card provides security for the control of these resources by matching picture identification with a name, number or similar information. For example, a driver's license includes a name, picture, address and license number. The picture is used to match a holder to the card and the name and number are used to look up a status of the license (e.g., suspended) or similar information. The identity card is typically assembled on a plastic substrate with image and text printed on the front and rear surfaces of the card. The identity card can be modified or replicated by a similar process or printing or attaching an photo over the true information to allow another person to utilize the card. A magnetic strip is attached to one surface upon which data is written. This information is accessible to skilled counterfeiters. Thus, all of the information related to the card is accessible making it easy for counterfeiters and those who intend to perpetrate identity theft to utilize this information.

For example, a driver's license can be counterfeited such that on inspection it appears to be a legitimate license. The features of a driver's license are discernable by visual inspection. The format of a portrait, license number, logo, watermark or similar feature can be easily inspected and replicated. The counterfeiter can produce driver's licenses that are visually identical to an actual driver's license. This allows individuals holding a counterfeited license to drive and gain access to locations without meeting a state's requirements for obtaining a driver's license. In addition, a stolen driver's license or similar identity card provides information to the thief about the user including the name, likeness, social security number or address. This information can be used to perpetrate fraud against the individual through identity theft.

Other identity cards issued by commercial institutions, employers, the government or other entities can similarly be modified or counterfeited and used for identity theft. This allows the holders of these modified and counterfeited cards or legitimate stolen cards to obtain benefits and gain access to resources illegally.

BRIEF DESCRIPTION OF THE DRAWINGS

The present invention is illustrated by way of example, and not by way of limitation, in the figures of the accompanying drawings in which:

FIG. 1A is a diagram of one embodiment of an identity card that is in a secure mode.

FIG. 1B is a diagram of one embodiment of an identity card that is in a display mode.

FIG. 2 is a diagram of one embodiment of the components of an identity card.

DETAILED DESCRIPTION

Figure 3:
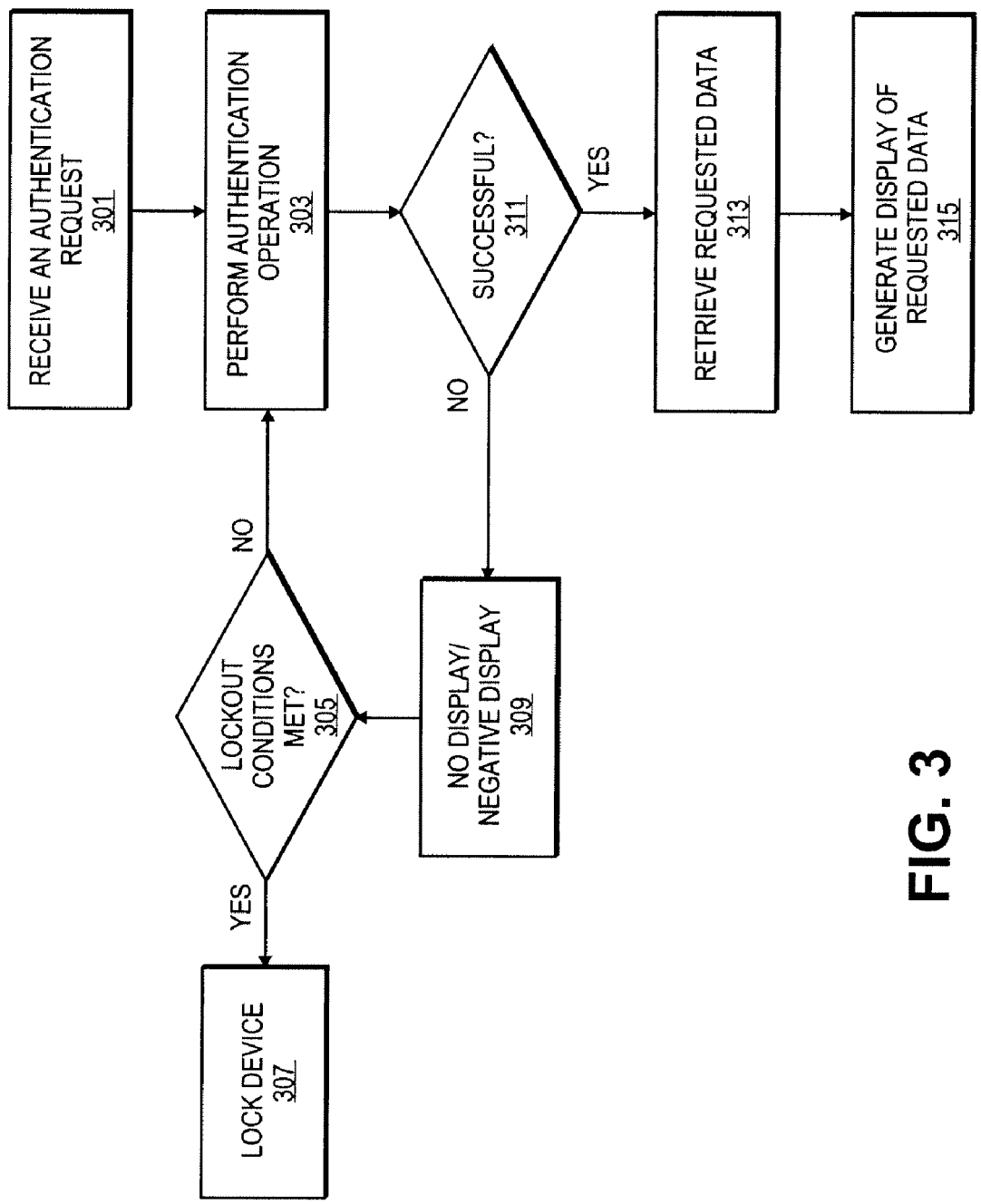
FIG. 3 is a flowchart of one embodiment of a process for activating a display mode or access mode of an identity card.

Described herein is a method and apparatus for an identity card with improved security features. The identity card has a programmable display. The display can be used to display sensitive data under user controlled or defined circumstances. The card may have an interactive interface to receive input from a user. The card may also have a input/output interface to allow the exchange of data from the card to an external device. These elements can be used together to give a holder of a card control over the access to the data in the card and thwart counterfeiting and identity theft.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus can be specially constructed for the required purposes or it can comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

FIG. 1A is a diagram of one embodiment of a front of an identity card. In one embodiment, an identity card 1001 has a size and dimension similar to that of a credit card or similar card that can be easily stored in a wallet, pocket or purse. The thickness of the card can be between $\frac{1}{8}^{th}$ of an inch and ½ of an inch. The length and width of the card can be between ½ an inch and 6 inches. The card has a flat rectangular shape.

In another embodiment, the identity card can have other shapes and sizes. The identity card can have a spherical, conical, cylindrical, irregular or similar shape. The dimensions can be any dimensions suitable for portability by an individual.

In one embodiment, the identity card 101 can have at least one user interface 103, a display area 109, an input/output port 105, public information 107 and similar components. The display area 109 can be controlled to display any information, video, image or similar data. In one embodiment, the display area 109 is provided by an electronic ink display or similar static display device. In another embodiment, the display 109 is a light emitting diode (LED) display, liquid crystal display (LCD), electron emitting device (EED) or similar display device. The electronic ink display provides a static display, that is, it can provide a display of information or an image without a driving signal or power. The display area 109 can be used to display secure information stored within the card with minimal power consumption. The display area 109 can also be used to display public or non-secure data including text and images. The display area 109 can occupy any amount of the surface area of the card 101. The display area 109 may be limited to a single side of an identity card or may occupy multiple areas on different surfaces of the identity card. The display area 109 can be provided by a single display device or can be provided by any number of display devices.

In one embodiment, the card 101 includes a user interface component 103. A user interface component 103 can be a set of touch sensitive pads, buttons, switches, scanning devices or similar input devices. A 'set' as used herein may refer to any whole positive number of items including one item. The user interface component 103 provides a method by which a user can supply analog or digital input to the identity card 101. The input data can be used to verify the identity of the holder, e.g., by a fingerprint scan, authenticate a request for access to data in the identity card, activate or manipulate the display area 109 or access similar identity card functionality.

In one embodiment, the identity card includes an i/o port 105. The i/o port 105 can be any type of communication interface including a serial or parallel port, universal serial bus port, wireless, optical, infrared or similar communication port. The i/o port 105 is used to exchange data between the identity card 101 including the processor, memory or similar internal component of the card with an external device.

In one embodiment, the identity card 101 includes public information 107. The public information is that information presented by the card that is easily understood and viewed by an individual. For example, an identification card 101 includes text identifying the badge as a 'security badge.' The public information 107 can be presented by conventional printing techniques or through any of the display devices 109 of the identity card 101. The public information may include any type or amount of information including a name, identification number, license number, company or organization information or similar information. The public information can be displayed on any surface or area of the identity card 101.

FIG. 1B is a diagram of one embodiment of an identity card that is in a display mode. A display mode can be activated through the user interface or similar activity. The display mode may display a predefined set of information or information specifically requested by the holder or user of the card. The displayed information can be private or public information. For example, a security badge displays an image 151 of the card holder along with text information 153 such as name, position, department and similar information about the card holder while in display mode.

Private information can be stored in any form within the identity card including being hard wired into the card, random access memory, read only memories, flash memories and similar storage devices. The private data can also be stored using any cyrptographic algorithm. Encrypting the data provides an additional level of security to prevent an unauthorized reading of the encoded data. The encoded private data can provide verification against improper access, modification or counterfeiting of the identity card. The private data can include matching data for the public data including an image, name, company information and similar information. This private data can be accessed by authorized individuals to verify the public information and approve security requests of an identity card holder. The private data enhances the security provided by the identity card because the data is not apparent to a viewer and imitation of the data will not result in data corresponding to modified public information and a counterfeited card will not have encoded data matching the public data. Similarly, the chances for identity theft are reduced as the private data is not easily accessed.

In one embodiment, the user interface may change from the secure mode to the display mode. For example, the user interface 103 may become a clear or exit navigation option 155 to allow a user to change the mode from the access or display mode to the secure mode. In other embodiments, the user interface 103 provides a series of menus or similar interactive elements that allow a user to navigate available information within the identity card. The user interface 103 can interact with the display device to provide the menus for navigation of the information within the identity card.

FIG. 2 is a diagram of one embodiment of the components of an identity card. In one embodiment, the components of the identity card 101 include a display 201, processor 203, memory 205, input device 211, I/O interface 209 and power source 207. In other embodiments, any of these components may be combined and some components, such as the direct input 211 and I/O interface 209, can be omitted.

In one embodiment, the display 201 is an electronic ink display. Electronic ink, also referred to as electronic paper or e-paper, is a type of display technology that attempts to provide the user with an experience similar to that of a printed document or content printed on a piece of paper. Electronic ink is capable of displaying images and text with the appearance of ink on paper or a similar medium. Electronic ink reflects light and does not require backlighting, in contrast to display types such as liquid crystal displays and plasma displays, and does not fire an electron beam at the screen like a cathode ray tube display. Electronic ink can display text and images indefinitely without requiring power. The image can be changed at any time. Electronic ink displays are composed of a grid of individually controllable pixels and can have any size or shape. The pixels are each stable or bi-stable (having an on and off state) allowing the pixel state to be maintained without power.

In another embodiment, the display can be an LCD, plasma, light emitting diode (LED), electron emission or similar display type. In a further embodiment, multiple displays can be included, as well as, any combination of display types. Lighting for viewing an electronic ink in dark conditions may be provided. Any resolution display can be utilize dependent on the type of information the card is designed to be display. Driving circuitry appropriate to the type of display is included and can be controlled or driven by other components of the identity card.

In one embodiment, the identity card includes a processor 203 or set of processors. A processor 203 can by any type of integrated circuit, including a general purpose processor, an application specific integrated circuit (ASIC) or similar component. The processor can manage a state of the identity card, such as the display mode and secure mode, drive the display, manage the power supply, process input and output and perform similar operations. The processor 203 can communicate with other components across an internal bus or similar interconnect system within the card.

In one embodiment, a memory device 205 or set of memory devices are present in the card. The memory device 205 can be any type of memory device including a dynamic or static random access memory (RAM), flash device, electronically erasable/programmable read only memory (EEPROM), optical storage, magnetic storage or similar storage device. The memory 205 can store instructions to be executed by the processor for providing functionality described herein and can provide working memory and data storage for the device.

In one embodiment, the card includes a power source 207. A power source 207 can be a stored power source or an active power source. A stored power source can be a battery or similar device. Any type of battery can be utilized including alkaline, lithium, or nickel-cadmium. Other storage power devices include fuel cells or similar power storage technologies. A port or adapter can be included to allow recharging or charging of stored power sources. An active power source can include a photo-voltaic cell, mechanical energy capture mechanism or similar mechanism for capturing or generating power. In one embodiment, any number of active and stored power sources can be used together to provide power to the card.

In one embodiment, an I/O interface 209 is included in the card 101. An I/O interface 209 can be any type of communication port and supporting circuitry to allow an external device to exchange data with the card 101. The I/O interface can be a USB port, firewire port, serial port, parallel port, infrared port, 802.11b/g transceiver, Bluetooth transceiver or similar communications port, protocols and supporting circuitry. The I/O interface 209 can be utilize to update the software or firmware of the card 101, data in the card, manage card settings or initialization or provide similar functionality.

In one embodiment, the card 101 includes a direct input mechanism 211. A direct input mechanism can be any type of input mechanism or set of input mechanisms to allow a user to access and interact with the data and functionality of the card 101. Input mechanisms include buttons, touchpads or touch sensitive displays, positional sensors, switches, wheels, trackballs and similar input mechanisms. Any number, placement and combination of input mechanisms can be utilized. For example, a section of a display can be designated to present menu options that are navigable by a touch sensitive region of the display. The input mechanism 211 can provide input signals directly to the processor or through other processing circuitry such as an analog to digital converter, the I/O interface 209 or similar circuitry.

FIG. 3 is a flowchart of one embodiment of a process for activating a display mode or access mode of an identity card. In one embodiment, the process is initiated by the card receiving an authentication request (block 301). The authentication request can be received through the input mechanism, I/O port or from a similar source. The authentication request can be in any form, using any protocol or similar format. For example, the authentication request can be a password entered through the input mechanism or a secure message from another device. In response to receiving the authentication request, the card performs an authentication operation (block 303). The authentication operation can be any type of authentication algorithm or program. The card may support any number of verification or authentication programs or algorithms. The response of the card to the authentication request is dependent on a determination of the success of the authentication operation (block 311).

If the authentication operation is successful, then the requesting party is allowed access to secured data and the card services requests for the secured data (block 313). A successful authentication operation can establish a secured channel or mode for further data exchanges including the reading or writing of data to and from the card. For example, a successful authentication of a password from the input mechanism enables the display mode of the card. This mode enables a user to access and navigate private data on the card. In another example, a successful authentication operation establishes a secured communication channel with a computer connected through the I/O port.

In one embodiment, the requested data is displayed through the display device. The display of the data can be driven by the processor of the card or similar component. The data displayed can be text, images, video or similar information. The displayed data may be cleared after a designated time period or at the direction of the user. The data displayed through an electronic ink display can be cleared, but is displayed without consumption of power.

If the authentication operation is not successful, then any request for data is denied and is not displayed (block 309). The card remains in a secured mode. The current display may not be modified or a notice of failure can be displayed. A user or connected device can repeat requests for data or entry into a display mode. In one embodiment, the card tracks repeated unsuccessful attempts to access secured information or to change the state to the display mode. The number of unsuccessful attempts can be checked to determine if the device should prevent or lock out further access attempts (block 305). The lock out check determines if an improper attempt to access the secured data has been attempted. The lockout check can be a simple check of a number of unsuccessful attempts or can encompass analysis of the attempts to determine if a failed attempt to access data is malicious. For example, the check can compare the input data with password data to determine if the input data is similar to the password data indicating a user is having difficulty remembering his password or if the data is clearly different on each access a malicious attempt can be inferred. If the device does not determine a lock out is appropriate then the device continues to process incoming authentication requests or may prompt a user or requester for further information to allow authentication by a secondary means. For example, if a password entered is unsuccessful then the next iteration of the authentication algorithm asks for an answer to a secret question. If the device decides to lock out access (block 307) then the input device or I/O port may be disabled or similar action may be taken. In one embodiment, the device cannot be reactivated and the data in the card may be erased. In another embodiment, the device can be unlocked by a special input or action.

Figure 4B:
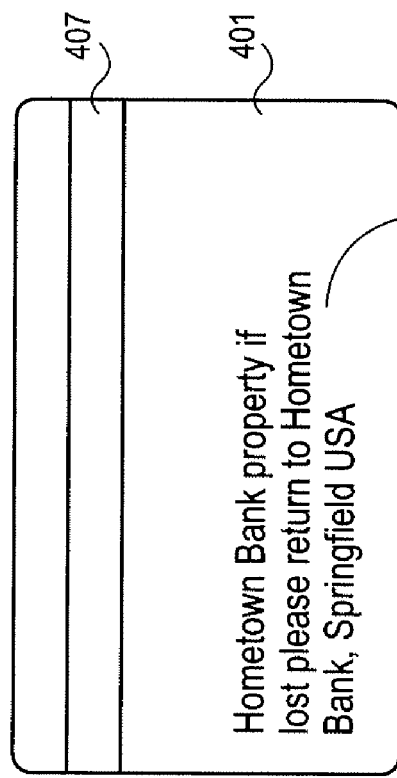
FIG. 4B is a diagram of one embodiment of a back of a bank card in secure mode.
Figure 4D:
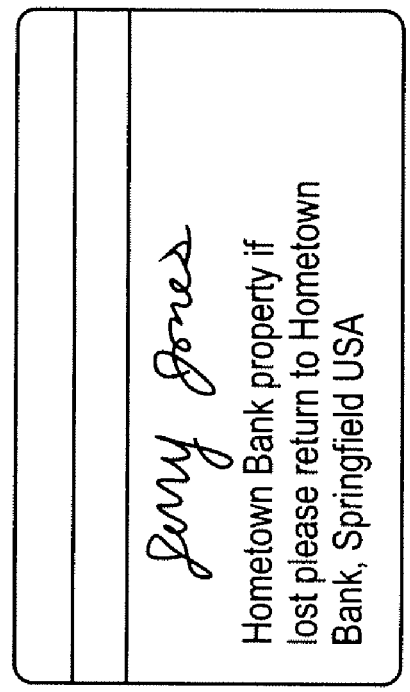
FIG. 4D is a diagram of one embodiment of a back of a bank card in an access mode.
Figure 4A:
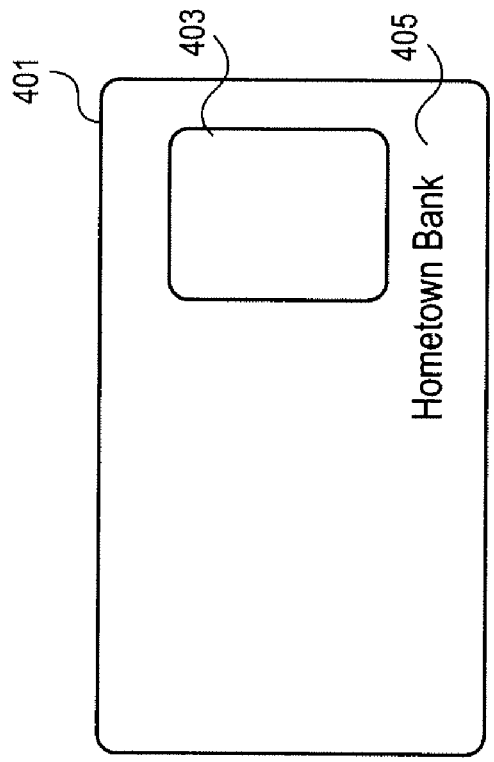
FIG. 4A is a diagram of one embodiment of a front of a bank card in secure mode.

FIG. 4A is a diagram of one embodiment of a front of a bank card in secure mode. In one embodiment, the card is a bank card storing account data for a user with an account with the issuing entity. In one embodiment, the card 401 includes identifying information for an issuing entity 405 or similar public information. The card 401 also includes an input mechanism. For example, the input mechanism can be a fingerprint scanner 403. Private data is not displayed in the secured mode and user interaction is limited to input that alters the mode from the secure mode to access mode.

FIG. 4B is a diagram of one embodiment of a back of a bank card in a secure mode. In one embodiment, the card includes a magnetic strip 407 or similar component. The magnetic strip 407 may serve as an I/O port allowing an external device to receive data stored on the card 401. The magnetic strip 407 provides backward compatibility with automatic teller machines and similar devices. In another embodiment, a magnetic strip is not present. Additional public data 409 can be printed on the reverse.

Figure 4C:
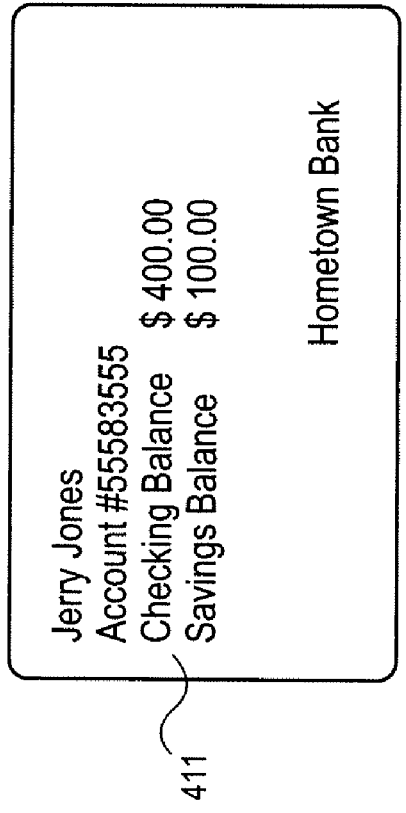
FIG. 4C is a diagram of one embodiment of a front of a bank card in an access mode.

FIG. 4C is a diagram of one embodiment of a front of a bank card in an access mode. In one embodiment, private data 411 from an account or similarly related to an issuing entity is available in an access mode of the card 401. A bank card 401 can display current account information including the user name, account number, balances and similar information. The data on the card can be updated through wire line or wireless communication protocols via the I/O port of the card.

FIG. 4D is a diagram of one embodiment of a back of a bank card in an access mode. The back side can also display any private data. For example, a signature can be displayed to replicate the conventional layout of a credit or debit card. The back side can also display other private information such as security codes and similar private data.

Figure 5:
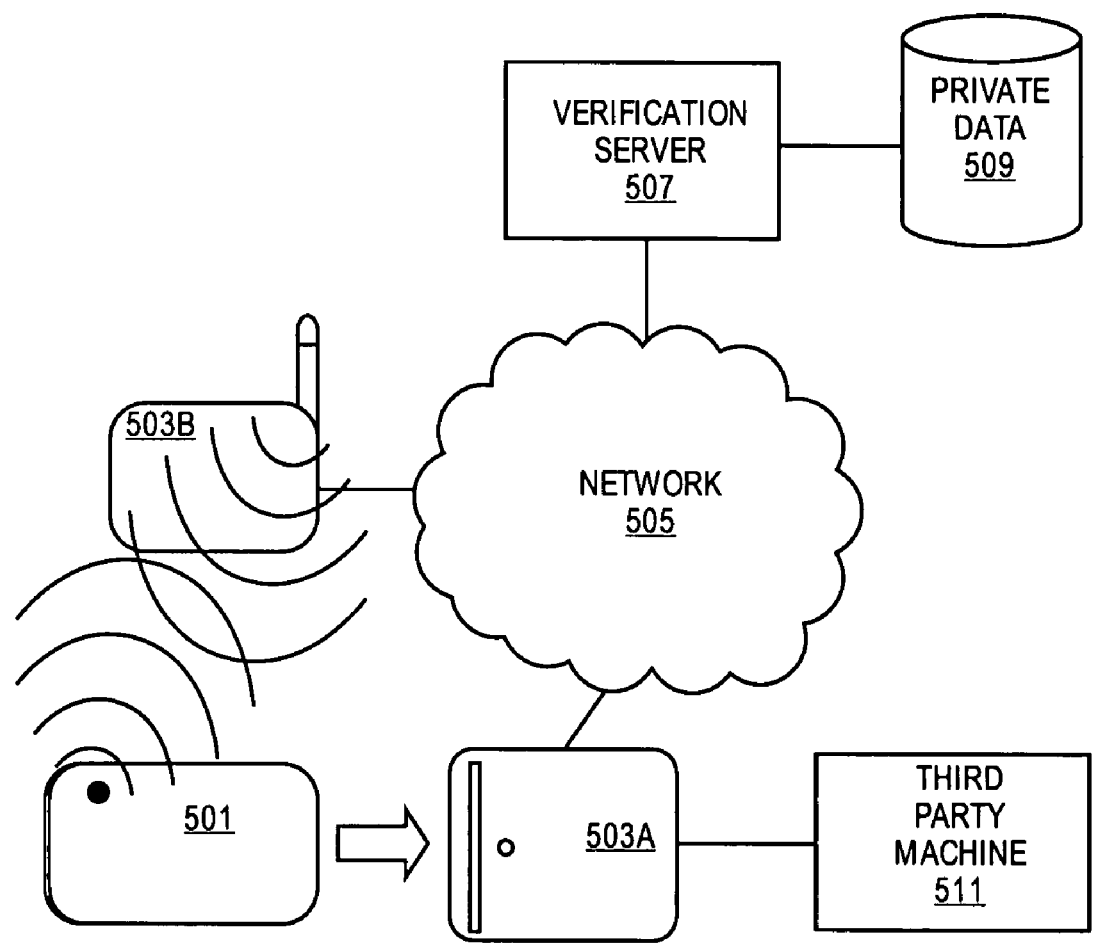
FIG. 5 is a diagram of one embodiment of a identity management system.

FIG. 5 is a diagram of one embodiment of an identity management system. In one embodiment the system includes cards 501, access points 503A and 503B, verification server 507, private database 509, network 505 and similar components. These components are managed by an issuer of the card 501 or related entity.

In one embodiment, a card 501 holder can update private data available through the card by interfacing with an access point 503A, 503B. An access point 503A connects with the card 501 through its I/O port. A wireless access point 503B communicates through a wireless protocol such as 802.11b/g/n, Bluetooth or similar protocol with the card. These access points enable communication between the card 501 and a verification server 507. To update or modify data on the card 501 a user may be requested to authenticate with the verification server. In another embodiment, authentication to the access mode of the card may be requested dependent. The type of authentication requested of the user or holder of the card 501 is dependent on the security required by the issuing entity.

The verification server 507 authenticates the access mode of the card and enables the exchange of data between the card 501 and a private database 509. Private data can be retrieved from the private database 509, uploaded to the private database 509 or compared with the private database. For example, a user with a bank card can update account information from the private database 509.

In another embodiment, the access points 503A, 503B can be administered or provided by third parties to allow authorized transfers of data from the card 501 or private data base 509 to a third party machine 511. The user authorizes this transfer, which is authenticated by the verification server 507. Funds or credit card charges can be managed in this manner where a merchant provides an access point that interfaces with its systems.

In one embodiment, components of the identity management and verification system are stored on a machine-accessible storage medium that may be a single medium. The term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for managing verification and authentication based on an identity card have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
   receiving an authentication request by a security card;
   performing an authentication operation by the security card, the authentication operation to authenticate a user over a network with a verification server;
   displaying secure information through an electronic ink display of the security card in response to the authentication operation being successful;
   displaying interactive elements enabling navigation of information on the security card through a user interface of the security card, wherein the user interface is a touch sensitive pad;
   transferring a user authorized data to a database over the network from the security card; and
   updating data on the security card received from the database over the network.

2. The computer-implemented method of claim 1, wherein displaying the secure information further comprises:
   displaying an image of a card holder.

3. The computer-implemented method of claim 1, wherein displaying the secure information further comprises:
   displaying bank account information of a card holder.

4. The computer-implemented method of claim 1, wherein displaying the secure information further comprises:
   displaying video of a card holder.

5. The computer-implemented method of claim 1, further comprising:
   preventing display of secure information by the security card, in response to the authentication operation being unsuccessful.

6. The computer-implemented method of claim 1, herein display of secure information occurs through the electronic ink display without an active power source for the security card.

7. The computer-implemented method of claim 1, further comprising:
   storing data about a card holder in the card.

8. The computer-implemented method of claim 1, wherein the security card has a form factor of a credit card.

9. A device comprising:
   a security card including,
   an electronic ink display to provide a static display of information,
   a direct input device coupled to the electronic ink display, the direct input device in the form of a touch sensitive pad
   and a processor coupled to the electronic ink display to drive the electronic ink display in response to an authentication operation being successful and to generate interactive elements enabling navigation information on the device to be displayed through the electronic ink display, the authentication operation to authenticate a user over a network with a verification server, the processor to drive a transmission of user authorized data to a database over the network from the device and updating data on the device received from the database over the network.

10. The device of claim 9, wherein the security card further includes a memory coupled to the processor, the memory to store security data related to a holder of the device.

11. The device of claim 9, wherein the security card further includes an input-output interface coupled to the processor, the input-output interface to transmit data to and receive data from a source external to the housing.

12. The device of claim 9, wherein the security device further includes a power source the power source to enable operation of the processor.

13. The device of claim 12, wherein the power source is any one of a battery or a photo-voltaic cell.

14. A machine readable storage medium, having instructions stored therein, which when executed, cause a machine to perform a set of instructions comprising:
   receiving an authentication request by a security card;
   performing an authentication operation by the security card, the authentication operation to authenticate a user over a network with a verification server;
   displaying secure information through an electronic ink display of the security card in response to the authentication operation being successful;
   displaying interactive elements enabling navigation of information on the security card through a user interface of the security card, wherein the user interface is a touch sensitive pad;
   transferring a user authorized data to a database over the network from the security card; and
   updating data on the security card received from the database over the network.

15. The machine-readable storage medium of claim 14, wherein displaying the secure information further comprises:
   displaying an image of a card holder.

16. The machine-readable storage medium of claim 14, wherein displaying the secure information further comprises:
   displaying bank account information of a card holder.

17. The machine-readable storage medium of claim 14, wherein displaying the secure information further comprises:
   displaying video of a card holder.

18. The machine-readable storage medium of claim 14, having further instructions stored therein, which when executed, cause the machine to perform a further set of instructions comprising:
   preventing display of secure information by the security card, in response to the authentication operation being unsuccessful.

19. The machine-readable storage medium of claim 14, wherein display of secure information occurs through the electronic ink display without an active power source for the security card.

20. The machine-readable storage medium of claim 14, having further instructions stored therein, which when executed, cause the machine to perform a further set of instructions comprising:
   storing data about the card holder in the card.

21. The machine-readable storage medium of claim 14, wherein the security card has a form factor of a credit card.

* * * * *